UNITED STATES PATENT OFFICE.

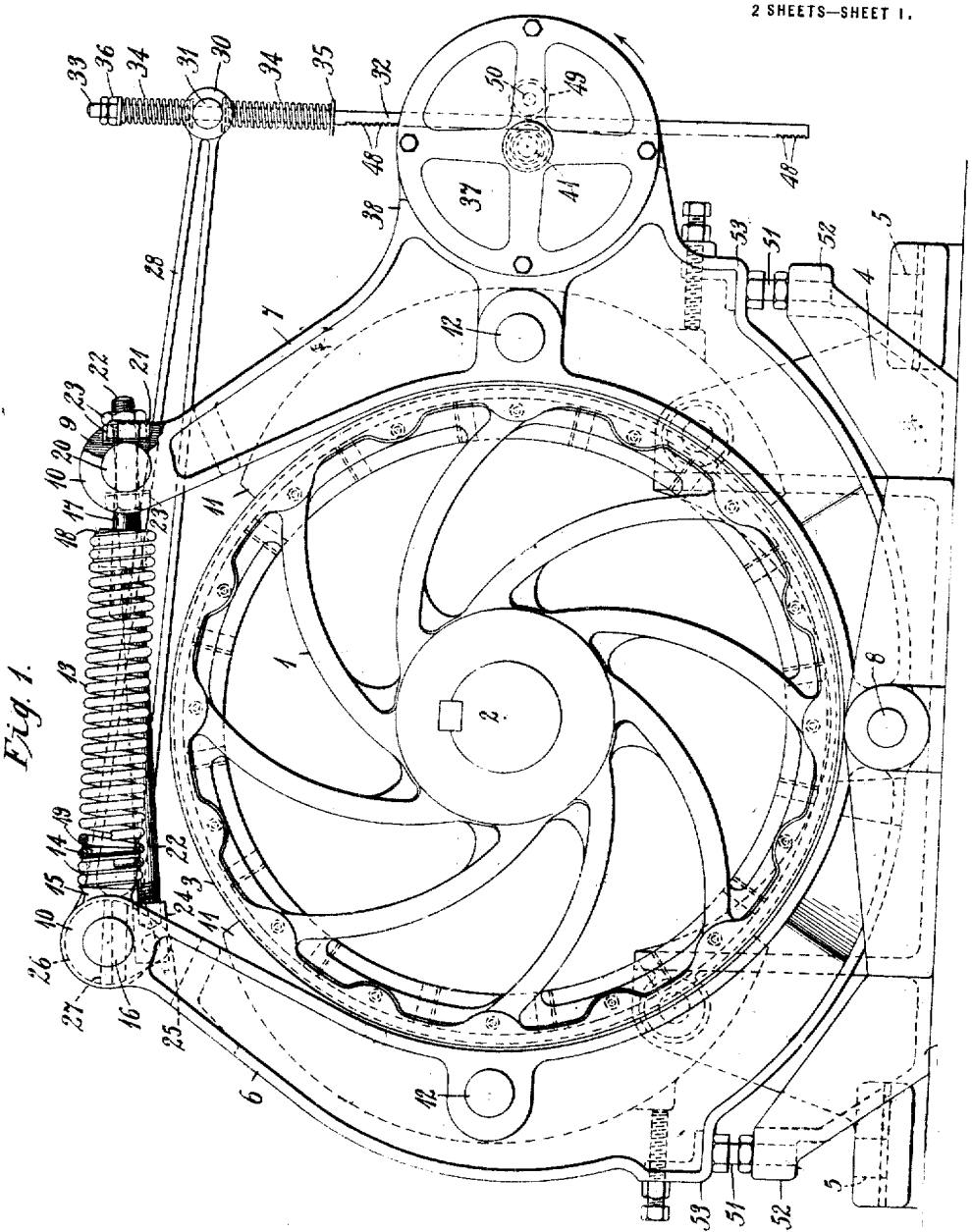

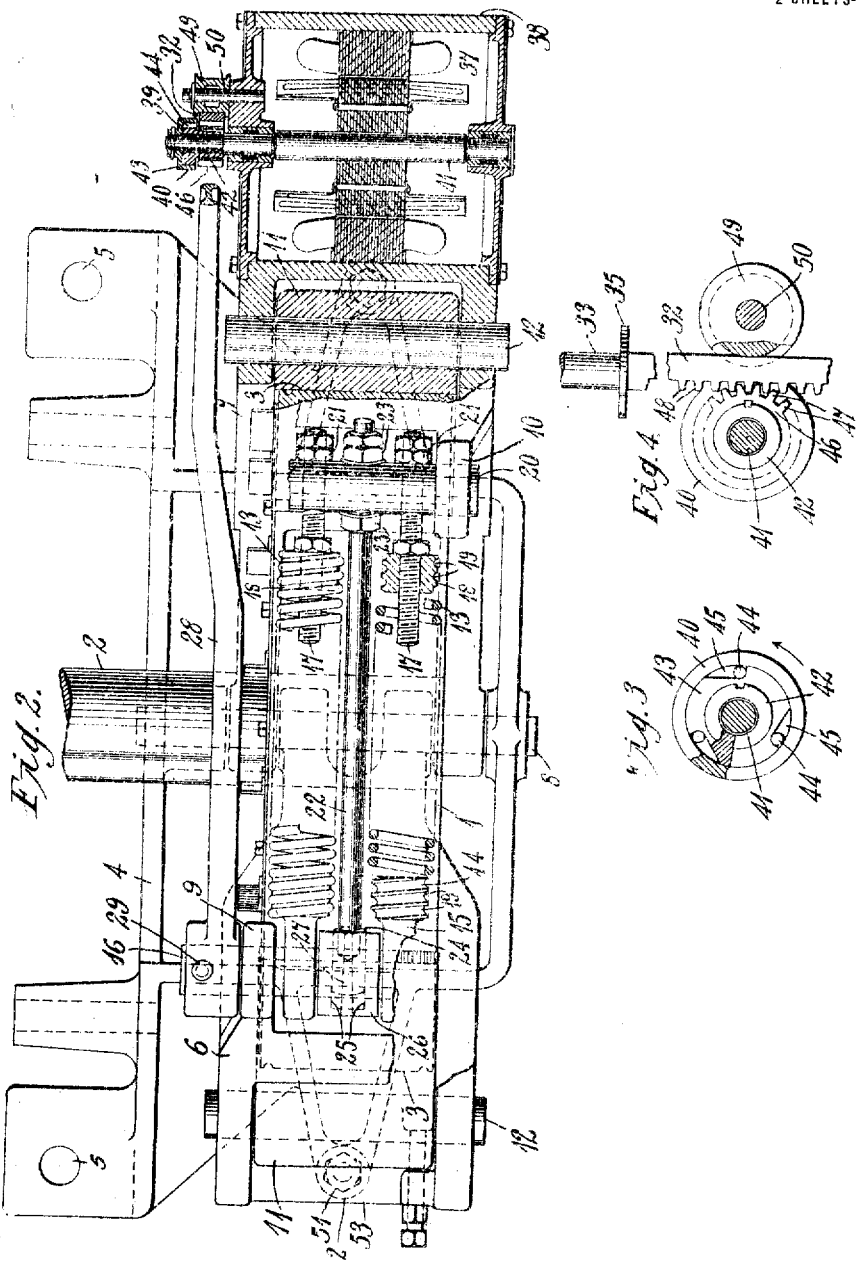

CHESTER B. MILLS, OF EAST McKEESPORT, AND JOHN P. NIKONOW, OF PITTSBURGH, PENNSYLVANIA, ASSIGNORS TO WESTINGHOUSE ELECTRIC AND MANUFACTURING COMPANY, A CORPORATION OF PENNSYLVANIA.

WHEEL-BRAKE.

1,204,471.  Specification of Letters Patent.  Patented Nov. 14, 1916.

Application filed March 7, 1913. Serial No. 752,635.

*To all whom it may concern:*

Be it known that we, CHESTER B. MILLS, a citizen of the United States, and a resident of East McKeesport, and JOHN P. NIKONOW, a subject of the Czar of Russia, and a resident of Pittsburgh, both in the county of Allegheny and State of Pennsylvania, have invented a new and useful Improvement in Wheel-Brakes, of which the following is a specification.

Our invention relates to wheel brakes such as are commonly used in connection with elevators, hoists, and rolling mills.

Our invention has for its object to provide an operating mechanism for brakes of the character above indicated which is simple and efficient in operation and which reduces the power required to operate such brakes.

In the operation of machinery which is motor driven, it is necessary, for purposes of control and safety, to use brakes which are automatic in operation and effective when applied. For example, in rolling mills and blooming mills, where frequent stops and reversals are necessary, brakes are essential for saving time in bringing the motors to rest before reversing and in assisting in accuracy of control. In the operation of elevators and hoists, brakes not only enable the attendant to stop the mechanism at any desired point, but automatically hold the load in case of failure of current supply from any cause whatever.

It has been the practice, heretofore, to release the brake by means of an electromagnet having sufficient power to overcome the tension of heavy springs which hold the brake shoes against a wheel when the magnet is not energized. The magnet must be large to furnish the power required and, on this account, it constitutes a material item of the cost of manufacture of the brake mechanism. It is not practicable to use a smaller magnet with a power-reduction mechanism because of the greater range of movement required on the part of the magnet armature and the resultant increase of the air gap to such length that the magnet would be ineffective.

In our invention, we employ a small electric motor which is connected to the brake shoes by suitable gearing mechanism and levers, as shown in detail in the accompanying drawings in which—

Figure 1 is an end view in elevation of the brake mechanism and a wheel to which it is applied, Fig. 2 is a view, partially in plan and partially in section, and Figs. 3 and 4 are enlarged views of details, partly in section.

The brake wheel 1 is mounted on the shaft 2 of an electric motor, not shown, and has a suitable periphery 3 adapted for frictional engagement with coöperating shoes. The base 4 of the brake, which may be of cast iron or other suitable material, is mounted upon any suitable supporting structure and is provided with holes 5 for fastening bolts. Two curved levers 6 and 7 are pivotally supported by a pin 8 at the center of the base 4 and extend upwardly at the sides of the wheel 1, each ending in a bifurcated portion having spaced lugs 9 and 10.

Each lever has a concave inner surface which forms a recess or housing in which a brake shoe 11 is pivotally mounted upon a support 12, the pivots being substantially diametrically opposite relative to the wheel 1. The levers 6 and 7 are normally drawn toward each other by tension springs 13, end coils of which engage grooves 14 of eye-bars 15 having a pivotal support on a rock shaft 16 mounted in the lugs 9 and 10 of the lever 6. Each of the springs 13 is attached to the lever 7 by a bolt 17 having an adjustable nut 18 provided with grooves 19 which engage the end turns of the spring.

The bolts 17 project through suitable openings in a rod 20 which is rotatably supported in the lugs 9 and 10 of the lever 7, the outer ends of the bolts being provided with nuts 21. A rod 22 projects through a suitable opening in the rod 20 and is retained by nuts 23, its other end being screwed into a lug 24 that has a pivotal support between the bifurcations 25 of a collar 26, which is mounted upon the rock shaft 16 and is fastened thereto by a pin 27.

One end of a lever 28 is attached, by means of a set screw 29 or other suitable device, to one end of the shaft 16. The opposite end of the lever 28 is provided with bifurcations 30 which rotatably support a rod 31. A rack 32 has an extended portion 33 that projects through a suitable opening in the rod 31 and is held in position by two buffer springs 34 which are retained by an abutment 35 and a nut 36, respectively.

An electric motor 37, which is preferably of the squirrel cage induction type, is mounted upon the lever 7 and has its frame 38 integral therewith. A collar 39, having a cylindrical flange 40, is rigidly mounted on the armature shaft 41. A sleeve 42 is loosely mounted on the shaft 41 and has a flange 43 between which and the flange 40 is a roller clutch of the usual construction having rollers 44 in grooves 45 in the flange 43. A pinion 46 having teeth 47 which mesh with teeth 48 on the rack 32, is keyed to the sleeve 42 adjacent the flange 43. A guide wheel 49 is rotatably mounted on a pin or stud 50 fixed on the motor frame 38 and holds the rack 32 in engagement with the pinion 46.

Normally, the springs 13 draw the levers 6 and 7 toward each other with the shoes 11 engaging the wheel 1, as shown in Fig. 1. When current is supplied to the motor through any suitable electrical connections, the motor shaft is rotated counter-clockwise, as shown by the arrows in Figs. 1 and 3. The flange 43 engages the rollers 44 and rotates the sleeve 42 and the pinion 46 to actuate the rack 32 upwardly and the rack, in turn, actuates the lever 28 to rock the shaft 16 and the collar 26 in a counter-clockwise direction. The collar 26 and the rod 22 now act as a toggle to separate the levers 6 and 7. This movement is limited by adjustable stops 51 that are mounted on projections 52 on the base 4 and engage shoulders 53 on the levers 6 and 7. The motor stops when the levers engage the stops 51, but its torque is constant while its circuit remains closed. When the circuit of the motor is broken, no torque is exerted and the tension of the springs 13 is then unopposed. The levers 6 and 7 are drawn toward each other, and the rod 22 and the collar 26 rotate the rod 16 in a clockwise direction for actuating the lever 28 to carry the rack downwardly. The motor is rotated backwardly by the pinion 46 and the roller clutch, and continues to rotate freely after the shoes 11 have engaged the wheel 1 by reason of the one-way clutch connection, thereby avoiding the causing of undue strains upon the parts by suddenly stopping the motor.

The brake is arranged to release the wheel 1 when the current is applied to the main motor and to hold the wheel when the main circuit is broken. This arrangement is made automatic by adapting the brake motor circuit to be closed and opened simultaneously with that of the main motor, or by connecting the brake motor in shunt with the main motor.

An important advantage of our improvement over the devices now used, is that, while the stops 51 may be adjusted to compensate for the wear of the brake shoes, it need be done only at long intervals, as the rack allows the range of movement to be shifted along its length without any manual adjustment. In the magnet brake, the wear of the brake shoes causes the length of the air gap of the magnet to vary, and frequent manual adjustment is thereby made necessary.

Another advantage of our invention is that the motor is integral with the brake lever, which arrangement permits the entire structure to be assembled as a unit, thus avoiding the inconvenience involved in mounting the motor separate from the brake and adjusting the connections between the two devices. The total power used by the motor is much less than that of a magnet because the latter has a variable air gap, while that of the motor is small and constant.

We claim as our invention:—

1. In combination, a wheel, brake shoes adapted for frictional engagement with said wheel, a motor mechanically connected to one of said brake shoes, and means for operatively connecting said motor to said brake shoes, said means comprising a rack and pinion and a plurality of levers.

2. In a wheel brake, a plurality of brake shoes, a wheel adapted for frictional engagement by said brake shoes, pivotally mounted levers for supporting said brake shoes, an electric motor, a pinion on the shaft of said motor, a slip clutch for connecting the pinion to the motor shaft, and a rack operatively connecting said pinion to said levers.

3. In combination, a brake wheel, a lever adjacent said wheel having means for engaging said wheel, and a motor on said lever having a rotatable element yieldingly operatively connected thereto.

4. In combination, a brake wheel, a lever adjacent said wheel having means for engaging said wheel, a motor carried by said lever and having a frame integral with said lever, and means comprising a rack and pinion mechanism for operatively connecting said motor to said lever.

5. In combination, a brake wheel, levers on opposite sides of said wheel, brake shoes on said levers, and a motor mounted on one of said levers and having a rotatable element yieldingly operatively connected to both of said levers.

6. In combination, a brake wheel, levers on opposite sides of said wheel, means for yieldingly drawing said levers toward said wheel, a motor on one of said levers, and a spring and gear mechanism for yieldingly operatively connecting said motor to said levers.

7. In a wheel brake, the combination with a wheel, a pair of brake shoes for frictionally engaging said wheel, a pair of pivotally mounted levers for supporting said brake shoes, an electric motor carried by one of said levers and having its frame integral therewith, and means for operatively connecting said motor to said levers, said means comprising a pinion, a one-way clutch and a rack.

In testimony whereof we have hereunto subscribed our names this 27th day of February, 1913.

CHESTER B. MILLS.
JOHN P. NIKONOW.

Witnesses:
HARRY T. GEORGE,
RAOUL TRUGGER.